(12) United States Patent
Przygodda et al.

(10) Patent No.: US 9,587,928 B2
(45) Date of Patent: Mar. 7, 2017

(54) COORDINATE MEASURING METHOD AND COORDINATE MEASURING MACHINE FOR MEASURING SURFACES, COMPRISING AN OPTICAL SENSOR

(71) Applicants: HEXAGON TECHNOLOGY CENTER GMBH, Heerbrugg (CH); HEXAGON METROLOGY GMBH, Wetzlar (DE)

(72) Inventors: Frank Przygodda, Lindau (DE); Thomas Jensen, Rorschach (CH); Jürgen Schneider, Linden (DE)

(73) Assignees: HEXAGON TECHNOLOGY CENTER GMBH, Heerbrugg (CH); HEXAGON METROLOGY GMBH, Wetzlar (DE)

( * ) Notice: Subject to any disclaimer, the term of this patent is extended or adjusted under 35 U.S.C. 154(b) by 212 days.

(21) Appl. No.: 14/421,388

(22) PCT Filed: Aug. 14, 2013

(86) PCT No.: PCT/EP2013/067046
§ 371 (c)(1),
(2) Date: Feb. 12, 2015

(87) PCT Pub. No.: WO2014/027052
PCT Pub. Date: Feb. 20, 2014

(65) Prior Publication Data
US 2015/0204653 A1    Jul. 23, 2015

(30) Foreign Application Priority Data
Aug. 17, 2012  (EP) .................................. 12180928

(51) Int. Cl.
*G01B 5/00* (2006.01)
*G01B 11/00* (2006.01)
*G01B 21/04* (2006.01)

(52) U.S. Cl.
CPC .......... *G01B 11/005* (2013.01); *G01B 21/045* (2013.01)

(58) Field of Classification Search
CPC ...... G01B 11/00; G01B 11/005; G01B 21/045
(Continued)

(56) References Cited

U.S. PATENT DOCUMENTS

| | | |
|---|---|---|
| 4,800,652 A | 1/1989 | Ballas et al. |
| 5,402,582 A | 4/1995 | Raab |

(Continued)

FOREIGN PATENT DOCUMENTS

| | | |
|---|---|---|
| CN | 2722197 Y | 8/2005 |
| CN | 101216299 A | 7/2008 |

(Continued)

OTHER PUBLICATIONS

European Search Report dated Dec. 11, 2012 as received in Application No. 12 18 0928.
(Continued)

*Primary Examiner* — Yaritza Guadalupe-McCall
(74) *Attorney, Agent, or Firm* — Maschoff Brennan

(57) ABSTRACT

Some embodiments of the invention relate to a coordinate measuring method for detecting an object surface by means of a coordinate measuring machine, comprising a measuring head for accommodating a sensor, a guiding unit for producing a relative movement of the measuring head in relation to the object surface in at least one direction, an optical sensor for detecting the object surface, and a control unit, the object surface being optically detected by the optical sensor during the coordinate measuring method, and (Continued)

a data set representing a surface profile in an object profile domain being generated. The data set is filtered by simulating contact of the surface profile represented by the data set with a virtual tactile sensor, and a tactile data set is derived from the simulated contact such that the tactile data set represents a virtual tactile surface profile in a virtual sensor domain.

19 Claims, 6 Drawing Sheets

(58) Field of Classification Search
USPC .......................................................... 33/503
See application file for complete search history.

(56) References Cited

U.S. PATENT DOCUMENTS

| | | | |
|---|---|---|---|
| 5,465,221 A * | 11/1995 | Merat | G05B 19/41875 700/160 |
| 5,471,406 A | 11/1995 | Breyer et al. | |
| 7,783,445 B2 * | 8/2010 | McLean | G05B 19/4207 33/503 |
| 2002/0185998 A1 | 12/2002 | Beck | |
| 2015/0204653 A1 * | 7/2015 | Przygodda | G01B 11/005 33/503 |
| 2016/0243703 A1 * | 8/2016 | Kovacs | B25J 9/1692 |
| 2016/0305777 A1 * | 10/2016 | Racine | G01B 21/00 |

FOREIGN PATENT DOCUMENTS

| | | |
|---|---|---|
| DE | 43 25 337 A1 | 2/1994 |
| DE | 43 25 347 A1 | 2/1994 |
| DE | 197 35 975 A1 | 3/1999 |
| DE | 10 2005 061 464 A1 | 7/2007 |
| EP | 1 474 650 A2 | 11/2004 |
| EP | 2 037 214 A1 | 3/2009 |
| FR | 273 8343 A1 | 3/1997 |
| JP | 3314101 B2 | 8/2002 |

OTHER PUBLICATIONS

Cheng et al., "Integrated laser/CMM system for the dimensional inspection of objects made of soft material", The International Journal of Advanced Manufacturing Technology, vol. 10, Issue 1, 2010, pp. 36-45.

Sladek et al., "The hybrid contact-optical coordinate measuring system", Measurement, vol. 44, Issue 3, Mar. 2011, pp. 503-510.

Wang et al., "Measurement Error Compensation Using Data Fusion Technique for Laser Scanner on AACMMs", Intelligent Robotics and Applications, Lecture Notes in Computer Science, vol. 6425, 2010, pp. 576-586.

Zhao et al., "Automated dimensional inspection planning using the combination of laser scanner and tactile probe", Measurement, vol. 45, Issue 5, Jun. 2012, pp. 1057-166.

* cited by examiner

COORDINATE MEASURING METHOD AND COORDINATE MEASURING MACHINE FOR MEASURING SURFACES, COMPRISING AN OPTICAL SENSOR

FIELD OF THE INVENTION

The invention relates to a coordinate measuring method for detecting an object surface of an object by means of a coordinate measuring machine, and to a coordinate measuring machine for detecting an object surface of an object, and to a computer program product.

BACKGROUND

In many technical areas of application there is a need to measure surfaces of objects and thus also the objects themselves with high accuracy. This applies in particular to the manufacturing industry, for which the measurement and checking of surfaces of workpieces are of great importance, in particular also for quality control purposes.

Coordinate measuring machines are usually used for these applications, said coordinate measuring machines enabling precise measurement of the geometry of an object surface, typically with micrometer accuracy. Objects to be measured may be, for example, engine blocks, transmissions and tools. Known coordinate measuring machines measure the surface by producing a mechanical contact and scanning the surface. Examples thereof are gantry measuring machines, as described e.g. in DE 43 25 337 or DE 43 25 347. A different system is based on the use of an articulated arm, whose measuring sensor arranged at the end of the multipartite arm can be moved along the surface. Generic articulated arms are described for example in U.S. Pat. No. 5,402,582 or EP 1 474 650.

In the prior art, a tactile sensor is used with such coordinate measuring machines as standard measuring sensor, said tactile sensor consisting of a ruby sphere, for example, which is mounted on a measuring bar. The deflection of the tactile sensor, in three mutually perpendicular directions X, Y and Z in the case of a coordinate measuring machine designed for three-dimensional measurements, is determined during the scanning by means of a switching element or distance measuring element. The location of the contact and thus the surface coordinates are calculated on the basis of the switching point or deflection distance.

In order to reconstruct the surface profile from the measurement data, it is necessary to take account of the mechanical dimensions of the sensor itself and the orientation thereof upon contact with the object surface. The sensor is embodied with a measuring tip of known geometry, typically spherical or ellipsoidal for specific applications, typically with a (main) radius of the order of magnitude of a few millimeters. In association with the present invention, the term "measuring tip" should generally be understood as (tactile) measuring sensor of any desired shape and extent, wherein said sensor need not necessarily (but can) have a tapering shape. The raw data measured by means of the coordinate measuring machine using a tactile sensor represent the measured spatial coordinates of a reference point of the measuring tip, for example of the center of the measuring tip, and are designated hereafter as relative to a "sphere center domain". By means of a transformation algorithm taking account of the shape of the measuring tip and the orientation thereof upon contact with the object surface, the measured coordinates are usually transformed from the sphere center domain into the computationally determined object surface profile ("object profile domain").

Owing to the physical dimensions of the measuring tip of the tactile sensor, however, the measurement resolution is restricted. The physical dimensioning of the measuring tip or the limited measurement resolution associated therewith leads to a "smoothing effect" during the measurement of rough surfaces: while elevations or peaks of an object surface can be measured almost perfectly or object-faithfully, the measuring tip of the tactile sensor, on account of its physical extent, cannot penetrate into narrow depressions of an object surface. This brings about a smoothing of the measured surface profile in a nonlinear manner by virtue of the measurement data of recessed surface regions being smoothed, while the measurement data of elevated surface regions are almost object-faithful. For technical engineering aspects this is even often advantageous because, in particular for a planar connection of surfaces of two objects, an accurate knowledge of the elevated regions thereof is often more important than the accurate determination of narrow recessed surface regions.

On the other hand, the resolution of tactile measurements, in particular for a more accurate measurement of surface depressions from the method-inherent limitations mentioned above, is no longer sufficient for many new applications.

Therefore, in the prior art approaches for contactless measurement, in particular by means of optical sensors, have been pursued in the meantime. By means of an optical sensor with an emitted measurement light beam, in particular from a laser, even surface depressions can be measured very accurately, as long as the focus of the measurement light beam, to be compared with the measuring tip of a tactile sensor, on the object surface is not larger than the structure of the depressions thereof. The resolution of optical measuring methods can accordingly be significantly higher than that of tactile measuring methods for an accurate measurement of surface profiles, in particular of the depressions thereof. Accordingly, a profile created by means of an optical sensor differs from a profile of one and the same object surface created by means of a tactile sensor. However, even a surface profile created by means of an optical sensor, in the same way as a surface profile created by means of a tactile sensor, constitutes an imaging of the actual object surface filtered in terms of its resolution on the basis of the physical dimensions of the "measuring tip", wherein the dimensions of the optical "measuring tip", in comparison with the measuring tip of a tactile sensor, can be regarded as converging towards zero or are negligible. Therefore, optical sensors and measuring methods for a coordinate measuring machine are suitable, in principle, for providing an actually object-faithful measurement of a surface profile.

Optical sensors that have been introduced into metrology with coordinate measuring machines in the meantime are based for example on laser light being radiated onto an object surface for interferometric measurements (EP 2 037 214). Methods based on white light interferometry (DE 10 2005 061 464) and chromatic-confocal methods (FR 273 8343) have also been proposed.

Optical sensors and measuring methods for a coordinate measuring machine are associated with a series of advantages: the measurement is carried out contactlessly, and the optical sensor can be led over an object surface more rapidly than a tactile sensor, with a smaller physical dimensioning of the "measuring tip", as result of which a higher lateral resolution of the measurement is made possible.

Nevertheless, not only surface profiles created by means of tactile sensors but also those created by means of optical sensors always also include features which do not originate from the measured surface, but rather are caused by the measuring method. By way of example, DE 197 35 975 discloses measurement errors when determining the height of a surface on account of vibrations of the coordinate measuring machine used and method measures for suppressing these effects.

The measurement results of optical sensors, in particular for interferometric measuring methods, are often disadvantageously influenced by phase noise or speckle effects. Depending on the roughness of the object surface, for example, the phase of the light reflected from a surface can be altered in such a way that a distance measured to a targeted object point is incorrect. As a consequence of such local optical disturbance influences, surface profiles measured by means of optical sensors often have measurement errors, such as, for example, virtual singular peaks or depressions which, however, do not exist in the object surface.

For removing the data of such incorrect measurements from the measurement results, a post-processing of the measurement results is usually carried out by means of a suitable algorithm for filtering the raw data. An extremely simple data filtering is based on a "moving averaging" of the measurement results, which involves, proceeding from a first measurement value, averaging the measurement values of a predetermined number of laterally sequentially recorded measurement values with the first measurement values and assigning the average value determined to a measurement center point assigned to the relevant measurement locations on the measured object, wherein this averaging method is then continued progressively for all measured measurement locations on the object. Other known filtering techniques are based on triangular or polynomial kernel filters or on specifically defined transformation functions in the frequency domain.

Since measurements by means of tactile and optical sensors are subject to different disturbance influences, the filter algorithms have to be adapted to the respective type of sensor.

Filters used for processing the results of tactile measurements usually have a less intense effect since the physical dimensioning of the measuring tip of a tactile sensor already leads to a smoothing effect. When the filters are applied to the measurement data in the sphere center domain, in which measurement data smoothed by the measuring tip (compared with the actual surface profile) are already present, only a small loss of information takes place for the filtered data inverse-transformed into the object profile domain. Particularly the measurement values of critical elevations or peak heights of the surface are scarcely influenced by the data filtering in the sphere center domain.

Filters used for processing the measurement data of optical sensors are provided, in particular, for eliminating measurement errors caused by optical noise and speckle effects and often have a more intense effect. By way of example, firstly a prefiltering is carried out by means of a narrow rectangular filter, in particular for eliminating speckle effects. When choosing the filter width, the diameter of the generated light spot of the measurement beam emitted by the optical sensor on the object surface and "blurring" of the measurement data brought about by the scanning movement of the measurement beam over the object surface are usually taken into account. In a second processing step, an additional filtering is then often carried out by means of a triangular filter kernel. Particularly when relatively wide triangular filter kernels are used, the maximum height of very narrow or pointed surface elevations can truncated. On the other hand, when relatively narrow filters are used, optical noise and/or effects of surface roughnesses not relevant to technical applications are not adequately suppressed.

Since optical sensors supply measurement values directly in the object profile domain, the data are reduced during filtering, without an inverse transformation, as early as in the object profile domain, which can lead to a loss of information including about actual, and not only artificial, surface features.

What is disadvantageous about the prior art, furthermore, is that the known methods for processing measurement data of optical sensors of coordinate measuring machines often lead to a loss of information about significant structure details, in particular narrow elevations, of an object surface.

One problem addressed by the invention is that of providing an improved coordinate measuring method and an improved coordinate measuring machine, comprising an optical sensor, wherein measurement data detected by means of the optical sensor can be processed further at least indirectly with a processing functionality provided for tactile measurement data.

A further problem addressed by the invention is that of providing an improved coordinate measuring method and an improved coordinate measuring machine whereby it becomes possible for a surface profile of an object to be created more object-faithfully by means of optical sensors and a comparability with measurement data from tactile surface measurements of the same surface is provided. In this case, one specific problem addressed is to avoid losses of information about narrow surface peaks.

SUMMARY

The invention relates to a coordinate measuring method for detecting an object surface of an object by means of a coordinate measuring machine comprising a measuring head having an optical sensor for detecting the object surface, and a guide for providing a relative movement of the measuring head with respect to the object in at least one direction, in particular in two directions. In this case, the guide should generally be understood as a means for providing a defined relative movement of the measuring head with respect to the object or with respect to a base of the coordinate measuring machine, said base defining an absolute reference. In this connection, the guide can be embodied for example as a linear guide with a rail and a slide or as a rotational joint guide with at least two joint elements, in particular articulated arms, which are pivotable and/or rotatable relative to one another.

Moreover, the coordinate measuring machine has a control unit, wherein in the context of the coordinate measuring method the object surface is optically detected by means of the optical sensor of the coordinate measuring machine and a data set representing a surface profile is generated in the process.

The invention involves filtering the data set by simulating a contacting of the surface profile represented by the data set with a virtual tactile sensor, and driving a tactile data set from the simulated contacting, such that the tactile data set represents a virtual tactile surface profile. In addition, surface coordinates for the object surface are derived from the tactile data set.

As a result, firstly, effects of optical noise caused by the use of optical sensors and surface roughness data not relevant to technical applications can be eliminated. Such an optimization can be used for practical-technical applications in order to convert a measurement profile based on the optical measurements from the original data into a state such that the profile thus generated is comparable with a tactile measurement of the same surface. As a result of the derivation of the tactile surface profile from the simulated tactile contacting of the surface, the properties of small elevations of the surface are maintained, in the same way as after a measurement by means of a real tactile sensor.

By way of example, laser scanners, line projection scanners, optical measuring systems based on interferometry, white light interferometers or measuring apparatuses operating by means of focus variation can be used as optical sensors in the context of the present invention.

Since optical sensors can be regarded as tactile sensors having a sensor radius of the contacting sensor element towards "zero", measurements by means of such an optical sensor are generated directly in the object profile domain and therefore require no further transformation or filtering for e.g. a subsequent surface reconstruction. By contrast, surface data detected in a tactile fashion, for further processing, have to be converted from the sphere center domain, in which they are detected, into the object profile domain. In other words, data generated such that they directly map the object surface are regarded as data generated in the object profile domain. Data which, although they were generated during a detection of a surface, represent the object surface only indirectly are understood as data generated in the sphere center domain. These sphere center domain data require a further transformation in order that the object surface is mapped directly, for which purpose e.g. the properties of a sensor used for detection (e.g. shape and size of a measuring tip) have to be taken into account.

A tactile data set is understood to be a data set which was derived e.g. from a data set originally generated by means of optical detection by an optical sensor, wherein, for such derivation, filtering is carried out by means of a modeled tactile measuring instrument. Such a tactile data set is generated by means of filtering and conversion of data from one into another (detection) domain, in particular by virtue of the fact that a simulated surface contacting with a virtual tactile sensor is carried out for the conversion.

Since the tactile data set generated during filtering by means of the simulated contacting with a virtual tactile sensor in turn indirectly represents the surface or the profile of the surface (the virtual tactile sensor has a specific virtual, modeled shape and virtual, modeled extent, which in each case influence the data derived thereby), the virtual sensor domain should be considered to be (hierarchically) tantamount to the sphere center domain.

In other words, the invention relates to a post-processing method or algorithm for measurement data detected by an optical sensor of a coordinate measuring machine. By means of the optical sensor, an object surface is measured and the surface is thereby mapped in the object profile domain. The post-processing of these generated profile data then involves carrying out a simulation of a contacting of the surface profile present in the object profile domain. For this purpose, a virtual tactile sensor is modeled and the latter is brought into contact virtually with the surface. This simulated contacting can be carried out for example one-dimensionally, i.e. one measurement point (coordinatively) is contacted, or multidimensionally, i.e. a plurality of points of a line or of an area are contacted. During a presence of such a contact, a reference point of the simulated sensor (e.g. a center point of a circular disc or of a sphere implemented as virtual sensor) is detected or calculated. Such contacting can then be carried out with regard to the totality of the data detected by means of the optical sensor, such that the surface points of the optically detected surface is mapped by a plurality of the reference points generated in the process. This reference point or the plurality of these points then represents the tactile data set. A surface profile (tactile surface profile) thus already transformed by derived therefrom, which surface profile represents the originally detected surface filtered by the virtual tactile sensor. By means of such filtering, surface coordinates, i.e. coordinates for each reference point and/or interpolated points, for the object surface can be derived from the tactile data set.

With regard to the implementation of the virtual tactile sensor, the latter can be implemented according to the invention in particular in an ellipsoidally shaped fashion, in particular as a full sphere or hemisphere. In this connection, furthermore, alternative virtual implementations can be embodied which enable an advantageous morphological mapping of the surface.

In the case of scanning along a line, in which case, therefore, only 2D data are present, the lateral extent of the virtual sensor can be considered as zero or tending towards zero. This shape corresponding to a circular disc takes account of the absence of measurement data perpendicular to the scanned line. In the transformation from the sphere or disc center domain to the object profile domain, only the sensor shape in the scanning direction is taken into account.

Especially when 3D data are present, the virtual tactile sensor can be implemented as a sphere having a defined sphere radius, in particular wherein the sphere radius is set depending on a surface smoothing to be provided. In this case, the virtual tactile sensor can be implemented in particular as a measuring tip having a defined tip radius, wherein the tip radius can be set depending on the surface smoothing to be provided.

In the context of filtering, it is thereby possible to generate measurement results which come close in particular to such measurement results with typical tactile sensors (e.g. a sensing probe with a ruby sphere as contact element) or are comparable therewith. This enables a user, without difficulties, to compare the measurement results based on an optical sensor with those based on a tactile sensor. Additional filtering of the optical measurement data can be carried out with a more weakly acting or set data filter or, if appropriate, can be omitted. By increasing the tip radius of the virtual tactile sensor, it is possible for a transition from a representation of the surface roughness to a representation of the associated surface morphology to be generated continuously or gradually. Radii having the measuring tip of a tactile sensor that can be implemented for such purposes, for determining surface roughness, undulation or morphology, can be gathered from the ISO standards 4287:1998 and 11562:1998, for example. The setting of the tip radius of the virtual tactile sensor makes it possible to set the smoothing by the method of processing in a desired resolution of the surface structures, by which means it is even possible to achieve a better suppression of noise, in particular of data noise caused by surface roughnesses, than with conventional methods for filtering the data of optical sensors of coordinate measuring machines.

Moreover, the shaping of the (simulated tactile) measuring tip can be implemented such that the data generated by means of a corresponding algorithm correspond as far as possible to the measurement results with traditional tactile sensors.

According to the invention, the simulated contacting can involve simulating a continuous sequential scanning of the generated surface profile (in the object profile domain) with the virtual tactile sensor and continuously deriving the tactile data set, in particular the tactile surface profile, therefrom, in particular wherein the scanning is carried out with line-by-line offset.

Moreover, according to the invention, the simulated contacting involves carrying out a multidimensional probing of the surface profile represented by the data set virtually in such a way that the tactile data set can be derived therefrom multidimensionally depending on a predefined lateral resolution, in particular wherein the virtual probing of the object surface can be carried out synchronously in relation to the area of the detected object surface. In other words, the object surface can be virtually probed simultaneously in its entirety and the tactile data set can be derived therefrom in one step (in contrast to continuous derivation).

Particularly in the case of scanning along a line, it can be advantageous to allow a priori information about the object surface contour, e.g. from a CAD model, to influence the calculation of the tactile data set. As a result, surface features situated laterally with respect to the scanning line, which bring about a "lifting" of a tactile sensor, can also be taken into account in the case of the virtual tactile sensor. The virtual data set thereby becomes better comparable with a purely tactile data set. In the transformation from the sphere center domain into the object profile domain, the a priori information is equally taken into account.

With regard to the abovementioned alternatives for simulated contacting, a for a respective measurement task to be performed or depending on the optical measurement data detected a specific method can be implemented. By way of example, a contacting method can be chosen depending on a time requirement and/or an accuracy requirement of the respective filtering. Said method can furthermore be performed successively or in particular simultaneously—for example for a comparison of the tactile data generated thereby.

In accordance with a further embodiment according to the invention, prefiltering is carried out in such a way that the surface profile generated by optical detection is averaged, in particular is smoothed, at least partly with regard to a height distribution present in the surface profile.

As a result, for example, the influence of optical noise or of speckle effects can be avoided or reduced, wherein it is possible to use for example a filter for averaging a predetermined number of sequentially laterally successive measurement values of the object surface, as described in the introduction. In this case, the filter can be set for averaging measurement values of measurement points arranged relatively close to one another on the measured object surface.

A prefiltering of the original measurement data can also be used for reducing the quantity of data and thus for reducing the associated processing time before the generated optical surface profile is converted into a (virtual) tactile surface profile. By way of example, a simple filter for averaging measurement results of measurement points arranged laterally adjacent on the object, as described previously, can be used for this purpose.

More specifically, according to the invention, deriving the surface coordinates can be carried out taking account of a parameter defining a shape and/or a spatial extent of the virtual tactile sensor from the tactile data set, in particular from the tactile surface profile, in particular taking account of the sphere radius, such that a reconstructed object surface can be derived.

In particular, according to the invention, simulating the contacting and deriving the tactile data set are carried out and the tactile surface profile thus represents the object surface as though the latter were detected by means of a real tactile sensor. After filtering, the tactile data set generated is accordingly present as though the surface had been scanned by means of a tactile sensor, and the tactile data map the surface detected in a tactile fashion.

The invention additionally relates to a coordinate measuring machine for detecting an object surface of an object comprising a base, a measuring head having an optical sensor for detecting the object surface, a guide for providing a relative movement of the measuring head relative to the base in at least one direction, in particular in two directions, and a control and processing unit. In addition, the coordinate measuring machine has a scanning functionality, upon the implementation of which, in a manner controlled by the control and processing unit, the object surface is detected by optical scanning by means of the optical sensor and a data set representing a surface profile is generated in the process.

According to the invention, the coordinate measuring machine furthermore has a filter functionality, upon the implementation of which, in a manner controlled by the control and processing unit by means of an algorithm, the data set is filtered by simulating a contacting of the surface profile represented by the data set with a virtual tactile sensor, and deriving a tactile data set from the simulated contacting, such that the tactile data set represents a virtual tactile surface profile. In addition, surface coordinates for the object surface can be derived from the tactile data set.

Furthermore, the control and processing unit is configured in such a way that an abovementioned coordinate measuring method according to the invention can be implemented, in particular wherein the filtering is implemented in a manner controlled by the control and processing unit.

Moreover, according to the invention, the guide of the coordinate measuring machine can be embodied as a linear guide having a guide element, in particular a rail, and having a drive element, in particular a slide, in particular wherein the drive element is movable in a motorized manner in a defined manner along the guide element.

In particular, the coordinate measuring machine can has a frame structure carrying the measuring head, wherein the frame structure is movable in a horizontal and a vertical direction relative to the base, in particular by means of the linear guide.

In this case, the frame structure can have at least one first and one second frame element and a vertical rod, in particular wherein the at least one first frame element is movable relative to the base by means of the guide.

The data set that is generated or can be generated during optical scanning of the object surface represents the surface profile in an object profile domain. Furthermore, the tactile data set that is derived or can be derived from the simulated contacting of the surface profile represented by the data set with a virtual tactile sensor represents the virtual tactile surface profile in a virtual sensor domain.

The invention furthermore relates to a computer program product, which is stored on a machine-readable carrier, for implementing the filtering according to the invention of the data set of the coordinate measuring method, in particular if the computer program product is executed on a control and processing unit of a coordinate measuring machine according to the invention.

BRIEF DESCRIPTION OF THE DRAWINGS

The method according to the invention and the apparatus according to the invention are described in greater detail purely by way of example below on the basis of specific example embodiments illustrated schematically in the drawings, further advantages of the invention also being discussed. Specifically in the figures.

DETAILED DESCRIPTION

Figure 1:
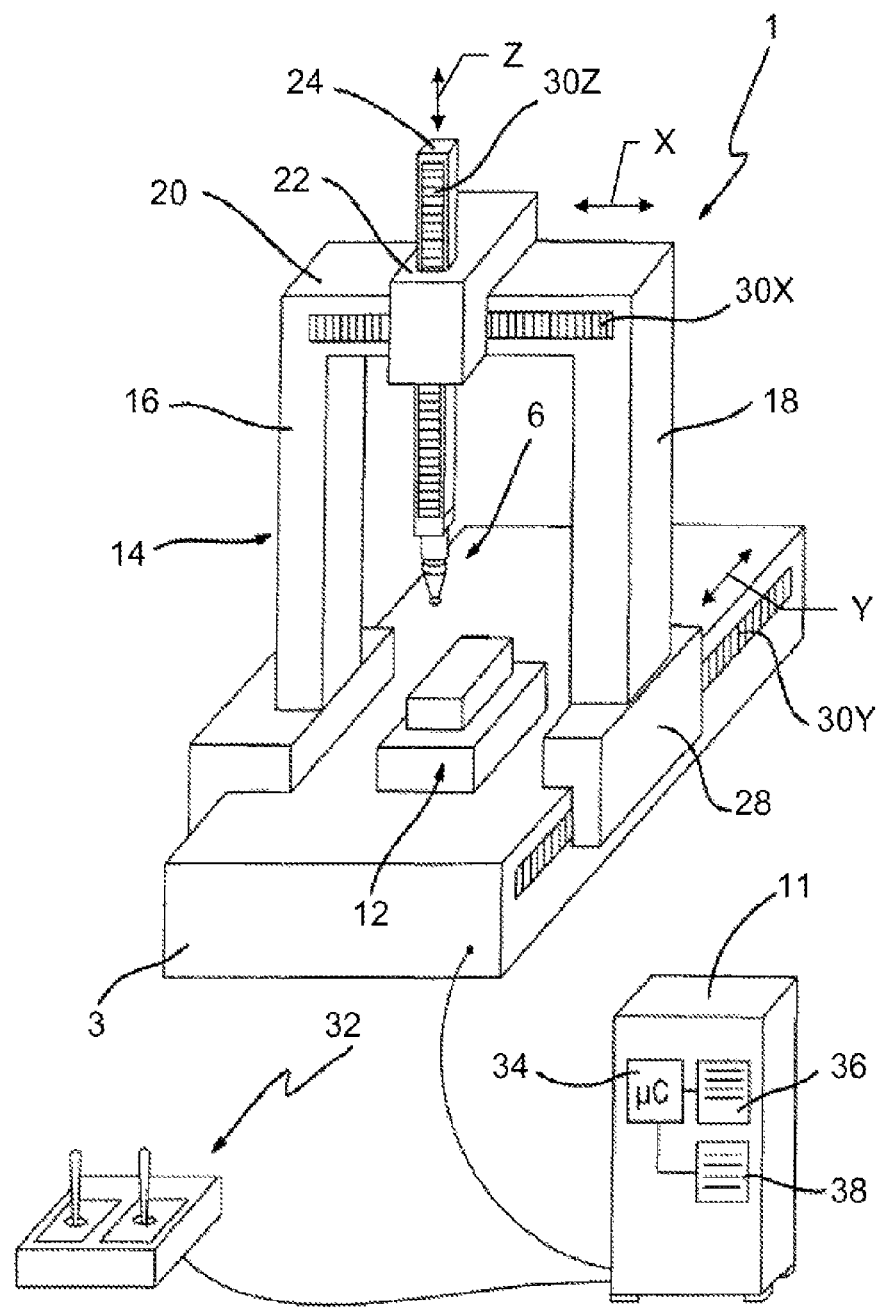
FIG. 1 shows a coordinate measuring machine, embodied by way of example as a gantry coordinate measuring machine.

FIG. 1 shows a coordinate measuring machine 1, embodied for example as a gantry coordinate measuring machine 1.

The coordinate measuring machine 1 has a base 3, on which a gantry 14 is arranged in such a way that it is movable in a longitudinal direction (Y-direction). The gantry 14 has two gantry supports 16, 18, a bridge 20 and a rod or Z-column 24, wherein the gantry supports 16, 18 are connected to one another at their upper ends via the bridge 20.

A slide 22 is arranged on the bridge 20, said slide being movable along the bridge 20, i.e. in a spatial direction (X-direction) linking the two gantry supports 16, 18. The rod or Z-column 24 is movable in a third spatial direction (Z-direction) and is guided in a receptacle of the slide 22. For this movement in the Z-direction, the Z-column 24 is guided in bearings that are parts of the slide 22. In particular, the three spatial directions X, Y and Z are aligned perpendicularly to one another, even though this is not a prerequisite for the present invention.

The coordinate measuring machine 1 is provided for determining one or a multiplicity of measurement points on an object 12 and therefore has three linear guide mechanisms for enabling a measuring head 6, which is arranged on the Z-column at the lower free end thereof facing the base 3, to move in the three spatial directions X, Y and Z relative to the base 3.

Each linear guide mechanism has an assigned guide (in the X-, Y- and Z-directions, respectively). Moreover, each linear guide mechanism has an assigned measuring element for position determination in the assigned guiding direction, for example measuring scales 30X, 30Y, 30Z for position determinations in the X-, Y- and Z-directions, respectively.

The measuring head 6 is provided with a receptacle for a sensor. By way of example, the measuring head 6 is provided with a stylus in this illustration. Generally, the measuring head 6 can be designed to receive tactile sensors, which establish a mechanical contact with an object surface to be measured, or contactlessly measuring sensors, such as, for example, capacitive, inductive and optical sensors.

The invention is not restricted to gantry coordinate measuring machines, as illustrated in FIG. 1. Rather, any known type of a coordinate measuring machine enabling an object surface measurement by means of an optical sensor is suitable for the invention.

In the example in accordance with FIG. 1, the gantry supports 16, 18 are in each case mounted on slides 28 movable in the Y-direction along the base 3.

The coordinate measuring machine 1 additionally has a control and processing unit 11, comprising a processor 34 and a multiplicity of data carriers 36, 38. By means of the control and processing unit 11, in particular, drives of the coordinate measuring machine 1 are driven and the measurement data are stored and processed. The control and processing unit 11 is preferably designed to enable fully automatic measurement of object surfaces.

For the purposes of direct user interventions or direct user control, however, the control and processing unit 11 can also be connected to a user console 32, in particular wirelessly e.g. via radio.

Figure 2A:
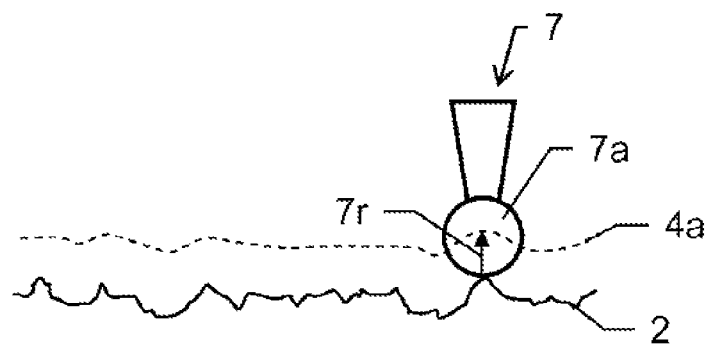
FIGS. 2a-b show illustrations of the scanning of a surface by means of a tactile sensor and the measurement data generated by means of the tactile sensor.
Figure 2B:
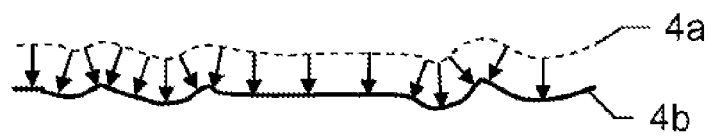
Figure 3A:
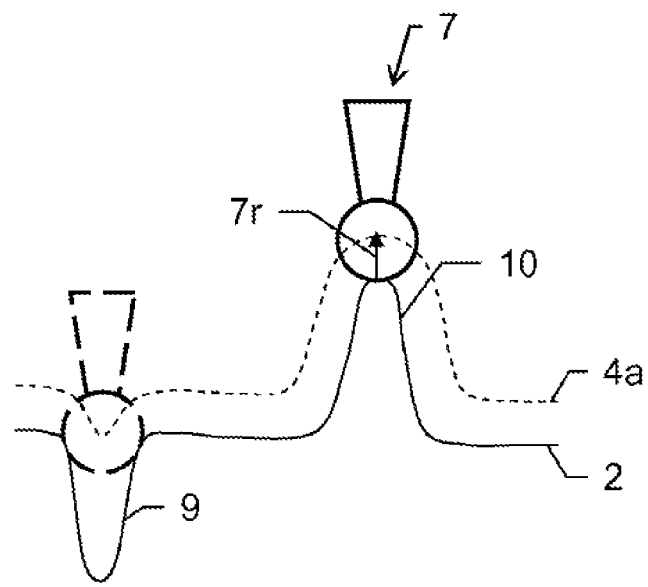
FIGS. 3a-b show schematic enlarged excerpts with respect to FIGS. 2a and 2b.
Figure 3B:
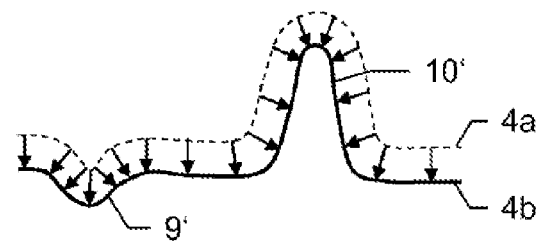

FIG. 2a and FIG. 2b and also schematic enlarged excerpts with respect thereto in FIGS. 3a and 3b illustrate the scanning of a surface 2 (physical surface) by means of a tactile sensor 7, which, in this exemplary illustration, has a circular-disc-shaped or spherical measuring tip 7a having a radius 7r. The surface 2 has an irregular structuring, with characteristic dimensions of elevations 10 and depressions 9, which, in particular with regard to their extent parallel to the surface 2 in the elevation maxima and depression minima, respectively, are smaller than the diameter of the measuring tip 7a. As a consequence, a profile 4a determined by means of the tactile sensor differs from the actual data profile of the surface 2, and the surface profile data 4b in the object profile domain, which surface profile data are generated from the profile 4a by reconstruction, symbolized by downwardly directed arrows in FIG. 2b, represent a smoothed mapping of the actual surface 2.

This smoothing is of a nonlinear type, as illustrated in FIGS. 3a and 3b by means of schematic enlarged excerpts with respect to FIG. 2a and FIG. 2b. FIG. 3a shows a surface 2 having a depression 9 and an elevation 10 and a substantially planar or smooth intermediate surface section, wherein the surface 2 is scanned by a tactile sensor 7 having a radius 7r of its circular-disc-shape or spherical measuring tip 7a. The measuring tip 7a can follow the elevation 10 and the flanks thereof in a substantially freely accessible manner. By contrast, however, the measuring tip 7a cannot penetrate or can penetrate only slightly into the narrow depression 9, in particular cannot penetrate as far as the deepest point thereof (local minimum).

As a consequence, from the profile 4a that is usually related to the sphere center domain, a reconstructed, non-linearly smoothed profile 4b in the object profile domain, in accordance with FIG. 3b, is generated: the reconstructed elevation 10' and smooth sections of the reconstructed surface 4b represent a substantially original-faithful image of the actual surface 2. By contrast, FIG. 3b shows an only greatly smoothed representation 9' of the actually much more greatly pronounced depression 9 of the surface 2.

Figures 4A, 4B:
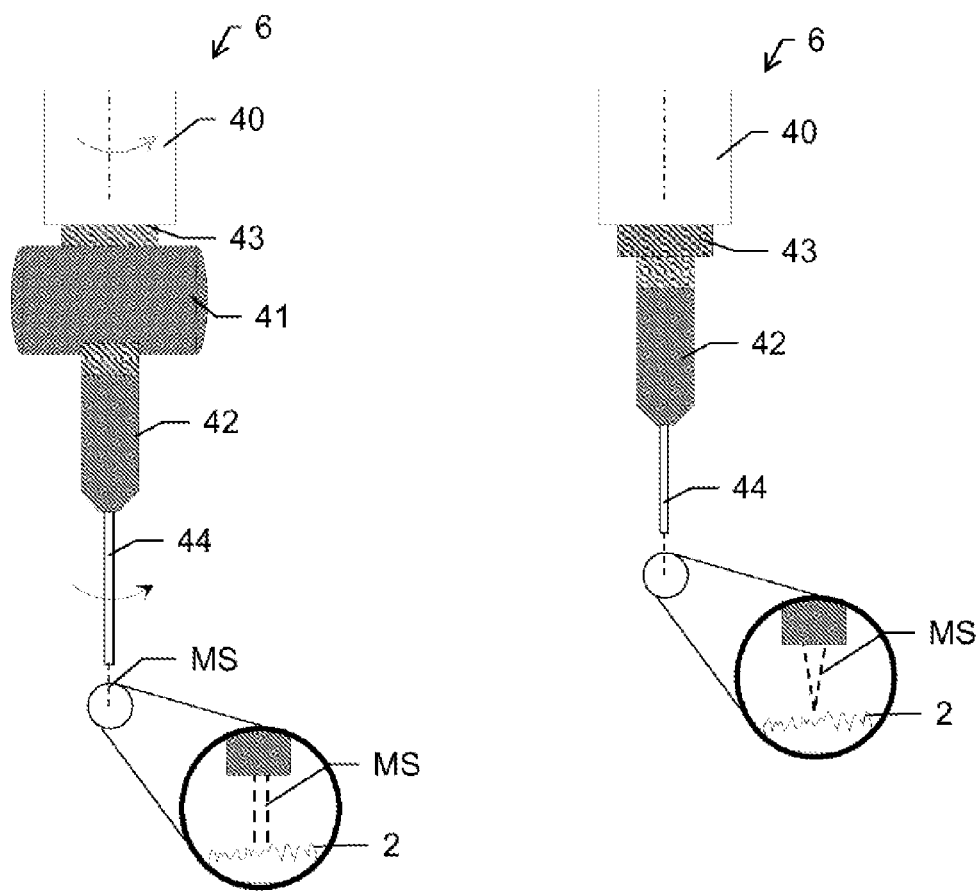
FIGS. 4a-b show exemplary schematic illustrations of a measuring head having an optical sensor for a coordinate measuring machine.

FIG. 4a shows an schematic illustration of a measuring head 6 having an optical sensor 42 for a coordinate measuring machine. The optical sensor 42 is fixed to a receptacle 43 at the end of an arm element 40 of the measuring head 6. In the operating state, the optical sensor 42 is guided over an object surface 2 to be measured in a scanning manner in a defined manner by means of the arm element 40 and a joint 41 on the receptacle 43 as guide means, wherein a relative movement relative to the object surface is made possible in at least one or two directions. In accordance with this example, a rotation of the joint 41 in relation to the arm element 40 is additionally made possible. As a result of the rotatability in relation to the arm element 40 and the subsequent joint 41, the optical sensor 42 can readily follow angled or greatly variable surface courses. In principle, however, even further rotational or translational degrees of freedom can be integrated into the guide means in order to enable further improved guidance of the optical sensor 42.

The optical sensor 42 has at least one surface-side emission and reception beam path for a laser beam or measuring beam MS. In this embodiment, the beam paths are guided through a thin tube 44 at the surface-facing end of the optical sensor 42, wherein, in accordance with this example, a radiation detector or else optical waveguide for forwarding to a radiation detector integrated elsewhere can be arranged in the thicker part of the optical sensor 42 adjacent to said tube 44. The tubular section 44 is optionally provided and, in particular, not necessary if predominantly planar areas and no drilled holes or small surface structures are intended to be measured. The optical sensor 42 can be controlled by the guide means such that the condition of substantially perpendicular impingement of the laser beam on the surface is complied with, in particular a deviation of +/−5° with respect to the surface normal not being exceeded. In this case, the optical sensor 42 can be moved such that it is moved continuously with constant alignment relative to a surface tangent, in particular with emission and reception beam path oriented perpendicularly to the surface tangent.

In the example in accordance with FIG. 4a, the tubular part 44 is embodied as rotatable in its longitudinal axis and thus in relation to the joint 41, as symbolized by an arrow. By this means, the measuring beam MS, particularly if it is at an angle with respect to the rotation axis, can also perform a circular scanning movement. A further alternative is a cruciform scanning method (not illustrated here). Such scanning movements can be used in particular also for rapid coarse measurement and thus for estimation of the position of a surface normal in that region of a surface which is to be measured.

FIG. 4b shows a modification of the embodiment in accordance with FIG. 4a for enabling local fine measurements. In this case, the measuring radiation MS is not emitted in a collimated fashion, but rather in a focused fashion in the near region for resolving a finely structured surface 2, as illustrated in an enlarged excerpt. Moreover, the embodiment in accordance with FIG. 4b has no joint.

Figure 5A:
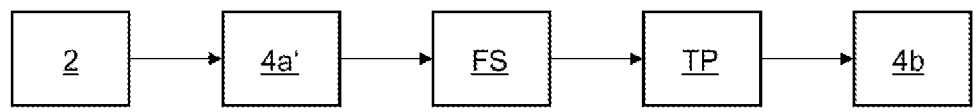
FIGS. 5a-b show block diagrams for illustrating known methods for processing the measurement data of coordinate measuring machines having tactile sensors or having optical sensors.
Figure 5B:
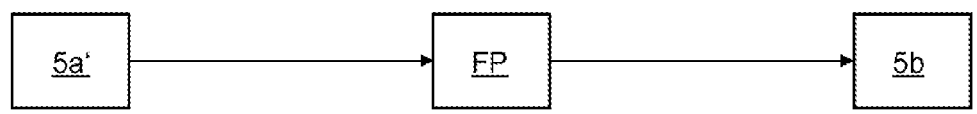

Known methods for processing the measurement data of coordinate measuring machines with tactile sensors are shown in FIG. 5a and with optical sensors in FIG. 5b on the basis of block diagrams.

In accordance with FIG. 5, firstly a surface 2 is detected or measured by means of a tactile sensor and measurement data 4a' are generated in the process. For processing, said measurement data, which represent the profile 4a related to the sphere center domain, are then typically used for the further processing. The data 4a' are processed by means of a filtering FS in the sphere center domain. This is then followed by a transformation TP into the object profile domain, thereby generating the reconstructed surface profile 4b in the object profile domain.

The filtering FS used for processing the results of tactile measurements usually has only a small additional influence on the surface profile 4b reconstructed from measurement data 4a', since the physical dimensioning of the measuring tip of a tactile sensor already leads to a smoothing effect. When the filtering FS is applied to the measurement data 4a' in the sphere center domain, in which already smoothed measurement data (compared with the actual surface profile 2) are present, only a small loss of information takes place for the filtered data inverse-transformed into the object profile domain. Particularly the measurement values of critical elevations 10 or peak heights of the surface 2 are scarcely influenced by the data filtering FS in the sphere center domain.

For the processing of measurement data of optical sensors as known from the prior art (FIG. 5b), the optically generated measurement data 5a', which—in a manner governed by the measuring method—are related directly to the object profile domain, are merely subjected to a filtering FP in the object profile domain, from which, without further data transformation, a reconstructed surface profile 5b is generated from the optical measurement data 5a'.

The filters used for processing the measurement data of optical sensors are provided, in particular, for eliminating errors caused by optical noise or measurement errors often have a greater effect than customary filters for measurement results with tactile sensors. Since optical sensors supply measurement values directly in the object profile domain, the data are reduced during filtering, without inverse transformation, as early as in the object profile domain, which can lead to a loss of information including about actual, and not just artificial, surface features.

The proposal according to the invention for generating data of surfaces measured by means of optical sensors, said data being better suited to practical-technical applications, is illustrated with reference to FIG. 6.

This approach is based on a conversion or transformation of the surface profile that can be generated by means of an optical sensor into a surface profile that can be generated by means of a (virtual) tactile sensor of a coordinate measuring machine. The virtual tactile sensor is simulated with a virtual measuring tip 8, embodied for example in a circular-disc-shaped or spherical fashion with a radius r in accordance with FIG. 6. The shape of the simulated measuring tip 8 is freely determinable. By way of example, the latter can have different sphere radii for simulating different desired measurement resolutions and/or, if appropriate, also different outer shapes (e.g. ellipsoids or cantilever tips, etc.) having different predefinable dimensions. It is thus possible to simulate a more or less restricted penetration of the virtual measuring tip 8 into a depression 9 of a real surface 2b measured from previously by means of an optical sensor. In this case, the optical measurement data correspond to a very accurate mapping of the object surface 2b, wherein these are method-inherently related to the object profile domain, typically, apart from optically governed measurement errors described above.

Figure 6:
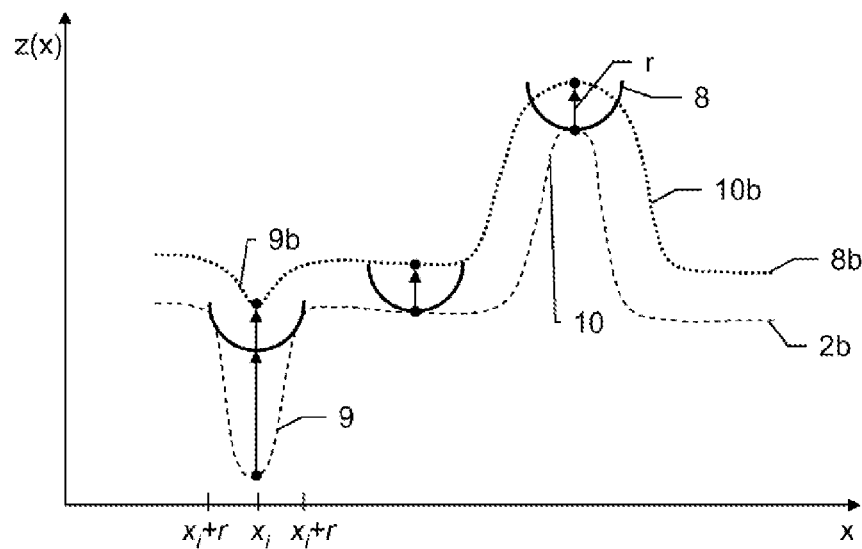
FIG. 6 shows an illustration of the method according to the invention for generating data of surfaces measured by means of optical sensors, said data being better suited to practical-technical applications.

In accordance with this approach according to the invention, which is illustrated in FIG. 6 by way of example for the implementation in one spatial dimension (X-direction) for the processing of height or depression data ("elevation data $z(x)$" in the Z-direction), but is provided, of course, in particular for areally extended measurements in the X- and Y-directions, the elevation data $z(x)$ determined by means of the optical sensor for each measurement point $x_i$ measured at the surface 2b determined height value $z_i$ are checked whether this measurement point can be reached, i.e. is mechanically contactable, for the virtual tactile measuring tip 8 or whether, on account of elevations adjacent to the measurement point $x_i$, penetration into a depression 9 present at the location point $x_i$ is restricted for the virtual measuring tip 8. This can take place numerically with the aid of the following calculation:

$$z'_i = z_i + \max(z_i(\xi) - s(\xi)) + r \qquad (1).$$

In this case:
z is the z-coordinate in the object profile domain;
z' is the z-coordinate in the virtual sphere center domain (virtual sensor domain);
r is the radius of the virtual sphere 8;
$\xi = [x_i - r, x_i + r]$ is the x-coordinates in the interval from $x_i - r$ to $x_i + r$; and
$s(\xi) = z_i - \sqrt{r^2 - (\xi - x_i)^2} + r$ is a semicircle representing the virtual sphere 8 by way of example.

The resulting values z'(x) represent the central coordinates of the virtual measuring tip 8, embodied in a spherical fashion in this example, in the virtual sensor domain (virtual sphere center domain). The application of the algorithm (1) to the measurement data brings about a smoothing of the measurement data from surface depressions 9 to depressions 9b reduced in terms of their depth in the data for the transformed surface profile 8b, since the virtual measuring tip 8 cannot penetrate into narrow depression structures 9 of the surface 2b. By contrast, the application of the algorithm (1) leaves the data for elevation structures 10 of the surface 2b in the transformed surface profile 8b substantially unchanged (profile 10b). A further filtering FS of the data in the virtual sphere center domain and corresponding data correction can be carried out as for the measurement data with real tactile sensors (see FIG. 5a).

It is pointed out that the transformation of the measurement data can also be carried out using other functions $s(\xi)$ for representing virtual tactile measuring tips embodied differently than in a spherical depression, for example for ellipsoid-like or user-defined measuring tip shapes. A user-defined shape can be described for example by $$s(\xi) = z_i + f(\xi - x_i),$$

wherein f(x) is defined for example by an assignment table with values for describing the specific, user-defined shape of the measuring tip.

In addition, it is pointed out that for the illustration in accordance with FIG. 6, for purposes of simplification, a surface scan only in one spatial direction, namely the X-direction, was assumed, and this scan in an arbitrarily selected coordinate system. In particular, in this case, transformation or filtering involve simulating a continuous scanning of the optical surface profile 2b by means of the virtual tactile sensor 8, in particular wherein the scanning can be carried out with line-by-line offset. According to the invention, a surface scanning or a surface scan can also be carried out in any other, arbitrary spatial direction, in particular can also follow a curved or a sharply bent line. The X-coordinate for the data transformation according to algorithm (1) should then be understood as a one-dimensional parameterization along the scanned line on the object surface.

To describe the invention in other words: the surface profile 2b generated by means of an optical sensor of a coordinate measuring machine is filtered, wherein the generated optical surface profile 2b is converted into a (virtual) tactile surface profile 8b in such a way that a contacting of the optical surface profile 2b with a virtual tactile sensor with a virtual measuring tip 8 is simulated. Depending on the simulated contacting, the (virtual) tactile surface profile 8b is derived, such that the (virtual) tactile surface profile 8b represents the object surface 2b as an object surface detected by means of a real tactile sensor. The reconstructed surface coordinates are derived from the (virtual) tactile surface profile 8b.

Figure 7A:
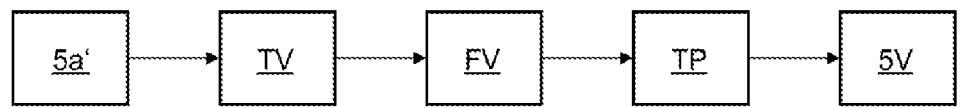
FIGS. 7a-c show block diagrams for illustrating the method according to the invention in various embodiments.
Figure 7B:
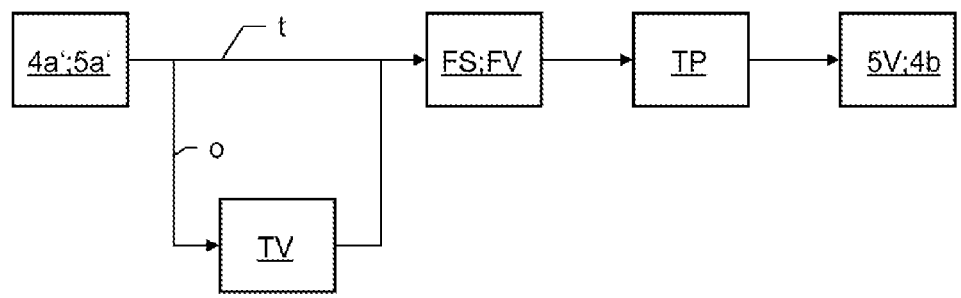
Figure 7C:
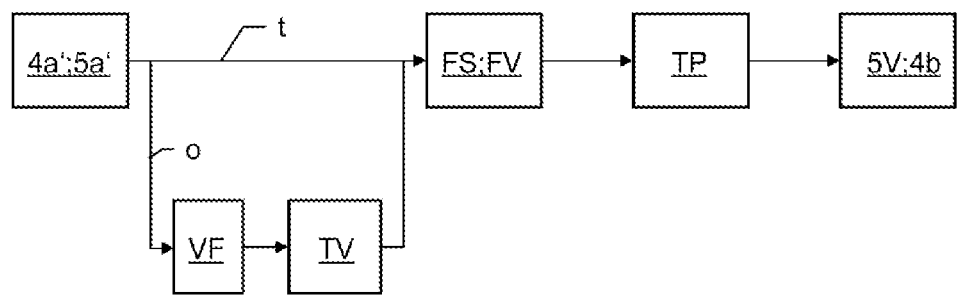

FIGS. 7a, 7b and 7c show in block diagrams embodiments of a method according to the invention for processing optically detected measurement data of coordinate measuring machines.

The block diagram in accordance with FIG. 7a differs from that in accordance with FIG. 5b by virtue of the step—interposed after the optical measurement data 5a' have been fed in—of a transformation TV into measurement data that can be generated by means of a virtual sensor, as described in detail above with reference to FIG. 6. This is followed by a filtering FV of the transformed data, which substantially corresponds to the filtering FS for tactile sensors in accordance with FIG. 5a, in particular taking account of specific properties (e.g. optical noise and measurement errors associated therewith) of the measurement data of optical sensors, as described above with reference to FIG. 5b. In this case, the configuration of the filtering FV can take account of the fact that the optical measurement data 5a' have already experienced a smoothing, in particular with regard to data of surface depressions, as a result of the transformation TV. This is then followed by a transformation TP into the object profile domain, whereby reconstructed surface data 5V are generated.

For processing measurement data both of optical and of tactile sensors, the invention can also be configured in a manner as illustrated by the block diagram in accordance with FIG. 7b. Measurement data 4a' of tactile sensors or measurement data 5a' of optical sensors are initially fed into the data processing process. A subsequent fork in the data processing determines whether the measurement data were generated by tactile measurements t or optical measurements o. Given the presence of measurement data of tactile sensors, the further data processing takes place, with a filtering FS, in the manner as described above with reference to FIG. 5a, for generating reconstructed data 4b generated from the tactile measurement.

Given the presence of measurement data of optical sensors, a transformation TV into data that can be generated by means of a virtual tactile sensor is carried out in a process branch, after which the further process of the data processing is continued, with a filtering FV as described with reference to FIG. 7a, for generating reconstructed data 5V.

A method illustrated in accordance with the block diagram from FIG. 7b has the advantage that method steps present for the processing of the measurement data of tactile sensors can largely be adopted, wherein, if appropriate, parameters, in particular during the filtering FV, can be adapted to the specific properties of the measurement data of optical sensors.

FIG. 7c shows a modification of the block diagram from FIG. 7b, wherein, in the branch for the processing of optical measurement data o, a method step VF for a prefiltering of the measurement data is inserted before the transformation TV into virtual measurement data. Said prefiltering VF can be advantageous in order to reduce or avoid an influence of measurement errors in optical measurements, e.g. with regard to optically measured surface elevations as a result of speckle effects, as early as before the data transformation TV. By way of example, the prefilter can be embodied as a simple algorithm for the moving generation of average values of adjacent measurement points. As a result, the quantity of data can already be reduced at an early stage of the data processing, as a result of which the processing time can be correspondingly reduced.

A computer program product taking account of the method steps in accordance with the block diagrams from FIGS. 7a, 7b and 7c is part of the present invention.

Figure 8A:
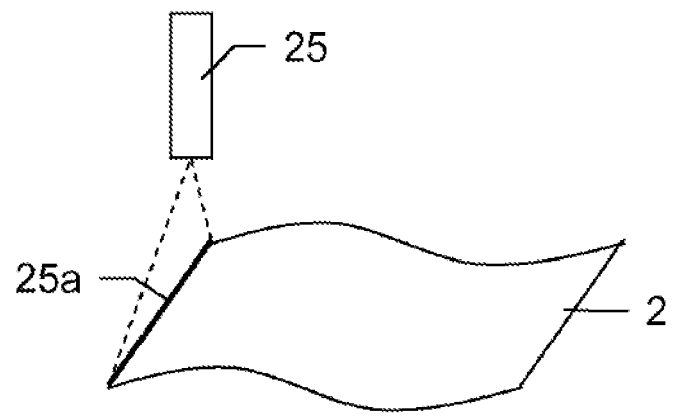
FIGS. 8a-b show schematic illustrations for representing the scanning of an object surface by means of optical sensors which are embodied with a line sensor and with an area sensor, respectively.

The method according to the invention has been described with reference to FIG. 6 for the data processing along a one-dimensional line of measurement points. According to the invention the algorithm (1) can be expanded for a processing of measurement data from two-dimensional measurements, for example in accordance with FIG. 8a with a line sensor 25 for generating a scanning line 25a from a surface 2, said line sensor being oriented in particular perpendicularly to the scanning direction. In that case, relative to a virtual, spherical measuring tip of a tactile sensor, the term s($\xi$) for describing a semicircle is replaced by a term s($\xi,\zeta$) for describing a hemisphere, wherein $\zeta$ denotes an extent of the virtual measuring tip in a Y-direction perpendicular to the spatial direction X, for example.

Figure 8B:
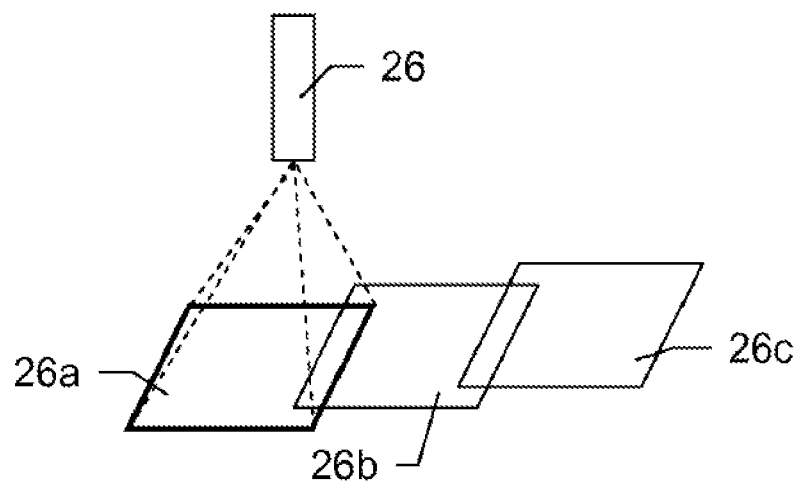

The method according to the invention as described with reference to the previous figures is also suitable for processing scanning data 26a, 26b, 26c determined by means of area sensors 26 (FIG. 8b), wherein the measurement data of measured area portions are joined together piece by piece in the context of the data processing in order to generate a data profile of the entire measured surface.

It goes without saying that these illustrated figures merely schematically illustrate possible embodiments. The various approaches can, according to the invention, likewise be combined with one another and with optical measuring and/or filtering methods from the prior art.

What is claimed is:

1. A coordinate measuring method for detecting an object surface of an object by means of a coordinate measuring machine comprising:
    a measuring head having an optical sensor for detecting the object surface;
    a guide for providing a relative movement of the measuring head with respect to the object in at least one direction; and
    a control unit;
    wherein in the context of the coordinate measuring method the object surface is optically detected by means of the optical sensor of the coordinate measuring machine and a data set representing a surface profile is generated in the process, wherein:
    filtering the data set by
    simulating a contacting of the surface profile represented by the data set with a virtual tactile sensor; and
    deriving a tactile data set from the simulated contacting, such that the tactile data set represents a virtual tactile surface profile; and
    deriving surface coordinates for the object surface from the tactile data set.

2. The coordinate measuring method as claimed in claim 1, wherein:
    the virtual tactile sensor is implemented in a disc-shaped fashion or in that the virtual tactile sensor is implemented in an ellipsoidally shaped fashion as a full sphere or hemisphere.

3. The coordinate measuring method as claimed in claim 1, wherein:
    the virtual tactile sensor is implemented as a sphere having a defined sphere radius (r), wherein the sphere radius (r) is set depending on a surface smoothing to be provided.

4. The coordinate measuring method as c claimed in claim 1, wherein:
    the simulated contacting involves simulating a continuous sequential scanning of the generated surface profile with the virtual tactile sensor and continuously deriving the tactile data set therefrom, wherein the scanning is carried out with line-by-line offset.

5. The coordinate measuring method as claimed in claim 1; wherein:
    the simulated contacting involves carrying out a multidimensional probing of the surface profile represented by the data set virtually in such a way that the tactile data set can be derived therefrom multidimensionally depending on a predefined lateral resolution.

6. The coordinate measuring method as claimed in claim 5, wherein:
    the virtual probing of the object surface is carried out synchronously in relation to the area of the detected object surface.

7. The coordinate measuring method as claimed in claim 1, wherein:
    prefiltering (VF) is carried out in such a way that the generated surface profile is averaged at least partly with regard to a height distribution present in the surface profile.

8. The coordinate measuring method as claimed in claim 1, wherein:
    deriving the surface coordinates is carried out taking account of a parameter defining a shape and/or a spatial extent of the virtual tactile sensor from the tactile data set from the tactile surface profile such that a reconstructed object surface is derived.

9. The coordinate measuring method as claimed in claim 1, wherein:
    simulating the contacting and deriving the tactile data set are carried out and the tactile surface profile thus represents the object surface as though the latter were detected by means of a real tactile sensor.

10. The coordinate measuring method as claimed in claim 1, wherein:
    the data set represents the surface profile in an object profile domain and the tactile data set represents the virtual tactile surface profile in a virtual sensor domain.

11. One or more non-transitory computer-readable media storing one or more programs that are configured, when executed, to cause one or more processors to execute the method as recited in claim 1.

12. A coordinate measuring machine for detecting an object surface of an object comprising:
    a base;
    a measuring head having an optical sensor for detecting the object surface;
    a guide for providing a relative movement of the measuring head relative to the base in at least one direction;
    a control and processing unit and
    a scanning functionality, upon the implementation of which, in a manner controlled by the control and processing unit, the object surface is detected by optical scanning by means of the optical sensor and a data set representing a surface profile is generated in the process, wherein:
    the coordinate measuring machine has a filter functionality (TV), upon the implementation of which, in a manner controlled by the control and processing unit by means of an algorithm, the data set is filtered by simulating a contacting of the surface profile represented by the data set with a virtual tactile sensor; and deriving a tactile data set from the simulated contacting, such that the tactile data set represents a virtual tactile surface profile; and surface coordinates for the object surface can be derived from the tactile data set.

13. The coordinate measuring machine as claimed in claim 12, wherein:

the control and processing unit is configured in such a way that a coordinate measuring method as claimed in any one of claims 1 to 9 can be implemented, wherein the filtering is implemented in a manner controlled by the control and processing unit.

14. The coordinate measuring machine as claimed in claim 12, wherein:

the guide of the coordinate measuring machine is embodied as a linear guide having a guide element and having a drive element, wherein the drive element is movable in a motorized manner in a defined manner along the guide element.

15. The coordinate measuring machine as claim claimed in claim 14, wherein the drive element comprises a slide.

16. The coordinate measuring machine as claimed in claim 15, wherein:

the frame structure has at least one first and one second frame element and a vertical rod, wherein the at least one first frame element is movable relative to the base by means of the guide.

17. The coordinate measuring machine as claim claimed in claim 14, wherein the guide element comprises a rail.

18. The coordinate measuring machine as claim claimed in claim 12, wherein:

the coordinate measuring machine has a frame structure carrying the measuring head, wherein the frame structure is movable in a horizontal (X, Y) and a vertical (Z) direction relative to the base by means of the linear guide.

19. The coordinate measuring machine as claimed in claim 12, wherein:

the data set represents the surface profile in an object profile domain and the tactile data set represents the virtual tactile surface profile in a virtual sensor domain.

\* \* \* \* \*